(12) United States Patent
Lebrun

(10) Patent No.: US 6,772,829 B2
(45) Date of Patent: Aug. 10, 2004

(54) HEAT EXCHANGE SYSTEM AND METHOD OF USE

(76) Inventor: Alan Lebrun, #1400 - 1122 - 4 St. SW., Calgary, Alberta (CA), T2R 1M1

( * ) Notice: Subject to any disclaimer, the term of this patent is extended or adjusted under 35 U.S.C. 154(b) by 0 days.

(21) Appl. No.: 10/146,881

(22) Filed: May 17, 2002

(65) Prior Publication Data
US 2003/0029605 A1 Feb. 13, 2003

Related U.S. Application Data
(60) Provisional application No. 60/302,703, filed on Jul. 5, 2001.

(51) Int. Cl.[7] .............................. F28F 9/22; F24H 3/02; F24H 3/06; F28D 1/04
(52) U.S. Cl. ....................... 165/121; 165/151; 165/122; 165/145
(58) Field of Search ................................ 165/121, 122, 165/145, 159, 157, 163, 151, 48.1; 126/101, 109; 43/124; 237/16, 17, 71

(56) References Cited

U.S. PATENT DOCUMENTS

| | | | | |
|---|---|---|---|---|
| 2,200,502 A | * | 5/1940 | Johnson | 62/419 |
| 2,499,901 A | * | 3/1950 | Brown, Jr. | 165/160 |
| 3,083,763 A | * | 4/1963 | Brown, Jr. | 165/159 |
| 3,927,299 A | * | 12/1975 | Sturgis | 126/101 |
| 3,998,188 A | * | 12/1976 | Priest et al. | 126/109 |
| 4,223,205 A | * | 9/1980 | Sturgis | 126/101 |
| 4,235,081 A | * | 11/1980 | Dowling | 62/93 |
| 4,325,171 A | * | 4/1982 | Nobles | 165/159 |
| 4,342,359 A | * | 8/1982 | Baker | 165/122 |
| 4,620,388 A | | 11/1986 | Imagawa | |
| 4,676,152 A | | 6/1987 | Tsuji et al. | |
| 4,738,225 A | * | 4/1988 | Juang | 122/367.3 |
| 4,817,329 A | | 4/1989 | Forbes | |
| 4,834,173 A | * | 5/1989 | Weiss et al. | 165/159 |
| 4,961,283 A | | 10/1990 | Forbes | |
| 5,203,108 A | | 4/1993 | Washburn, Jr. | |
| 5,365,887 A | * | 11/1994 | Fenn | 122/18.4 |
| 5,792,419 A | | 8/1998 | Williamson et al. | |
| 6,227,289 B1 | | 5/2001 | Yokoyama et al. | |
| 6,269,782 B1 | | 8/2001 | Kayahara et al. | |

FOREIGN PATENT DOCUMENTS

JP   02130334 A  *  5/1990  ............. F24F/1/02

OTHER PUBLICATIONS

Armstrong et al., Hot Air Disinfestation of Fruit and Vegetables, Oct. 2, 1990, U.S. Statutory Invention Registration, H828.

Material Safety Data Sheet, Eco$_2$Fume$^{tm}$ Fumigant Gas, BOC Gases, MSDS: G–245, Apr. 11, 1997, 7pp.

ThermaPure, Internet website, http://www.thermapure.com/ and http://www.thermapure.com/whatis.htm, Jan. 22, 2002, 3 pp.

(List continued on next page.)

Primary Examiner—Henry Bennett
Assistant Examiner—Tho Duong
(74) Attorney, Agent, or Firm—Sean W. Goodwin

(57) ABSTRACT

An improved heat exchange apparatus for insertion in a housing comprises heat exchange tubes extending substantially parallel to a direction of fluid flow through the housing and a plurality of spaced and circumferential fins formed along the heat exchange tubes and extending substantially perpendicular to the direction of fluid flow through the housing. Preferably the housing is fit with a fluid mover for driving the fluid over the tubes. The improved heat exchanger can be applied in a method for extermination of pests comprising providing a minimal envelope, heating ambient air within the envelope using the improved heat exchanger and discharging the heated air into the envelope so that the temperature of air in the envelope is sufficiently high to kill pests. Moving air across steam filled tubes enables use of the system in explosion classified areas and without damage to goods or equipment.

10 Claims, 6 Drawing Sheets

OTHER PUBLICATIONS

W.A. Stone, Internet website, ThermaPure information page, http://www.sandiegothermapure.com/thermapure_system_info.htm, Jan. 22, 2002, 7pp.

U.S. EPA, Internet website, Methyl Bromide Alternatives Case Studies, http://www.epa.gov/spdpublc/mbr/heatlog2.html, Jan. 22, 2002, 8pp.

Mandev Tubes, Internet website, Finned Tubes, http://www.mandevtubes.com/fintubes.htm, Jan. 22, 2002, 6pp.

Markel Products Co., Internet website, Hazardous Location Heater, http://www1.thomasregister.com/olc/markel/hazloch2.htm, Jan. 22, 2002, 3pp.

Precision Works Inc., Internet website, Mortality Rate of Insects, http://www.precisionworksinc.com/Heat/SlideShow/sld017,htm, Jul. 3, 2001, 1pg.

Pest–Heat®, Internet website, Pest–Heat® Thermal Pest Eradication, http://www.pestheat.com/page431697.htm, Jul. 3, 2001, 2pp.

At Your Service Exterminators, Internet website, Thermal Pest Eradication, http://www.win–win.com/aysexterminators/special.htm, Jul. 3, 2001, 2pp.

* cited by examiner

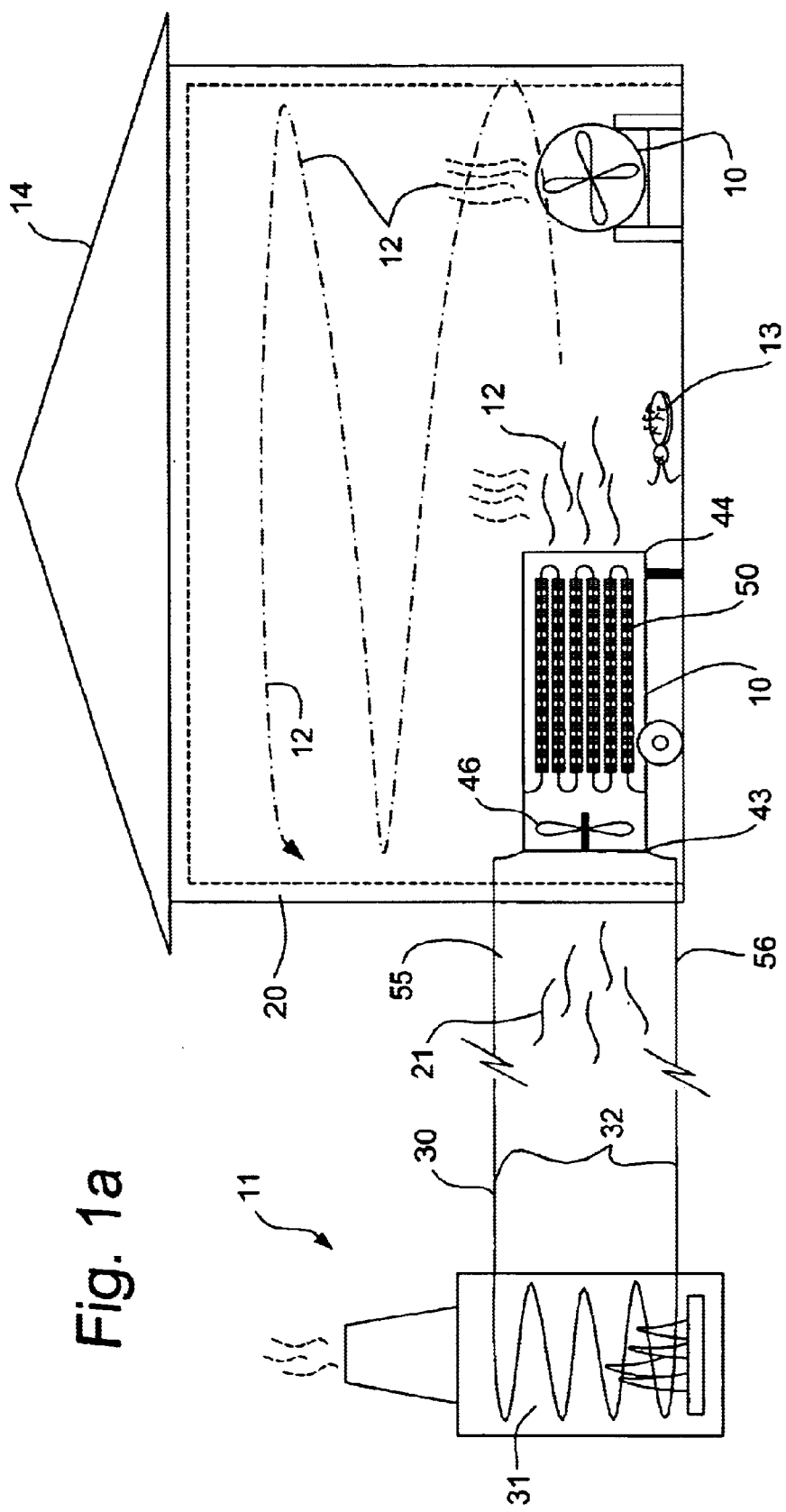

HEAT EXCHANGE SYSTEM AND METHOD OF USE

CROSS REFERENCE TO RELATED APPLICATION

This application is related to U.S. provisional application Ser. No. 60/302,703, filed Jul. 5, 2001, the entirety of which is incorporated herein by reference.

FIELD OF THE INVENTION

The present invention relates to a heat exchanger comprising finned tubes with the fins oriented transverse to fluid flow. In particular, the heat exchanger is applied for the extermination of pests and molds using heated air, and more particularly to the use of an explosion-proof heat exchange apparatus for safely directing heated air into and within an envelope enclosing an explosion hazard.

BACKGROUND OF THE INVENTION

Extermination of pests, such as insects, present in stored food products has been conducted by chemical and by heating systems.

Chemical Systems

Methyl bromide has been the chemical of choice by the world for over 60 years for the control of stored food product pests as it is effective and safe to use with all foods, yet is lethal to known stored product pests in substantially any stage of development including eggs, larvae, pupae and adults, and also to rodents. However, methyl bromide is also hazardous to handle, requiring specially trained applicators under strict guidelines established by individual countrys' governing bodies.

As well as being hazardous to humans during handling and treatment, methyl bromide has also been identified as an ozone depleting substance and its use in the food industries is scheduled to be banned by Jan. 1, 2005. Treatment for import and export applications will be the only industry that will have the continued use of methyl bromide after 2005 and it will be used strictly for quarantine situations only. Production quotas for methyl bromide have already been cut repeatedly with further reductions anticipated. Further, the cost of methyl bromide has increased four fold and is expected to double if not triple again before the next production quota reduction planned for the year 2003.

The EPA & USDA have estimated the phase-out cost to be in the billions of US dollars. In Florida and California alone, their best estimates are in the $4.0 billion dollar range. These two states were used as estimates because of their considerable involvement in supplying fresh fruits and vegetables throughout the US and Canada.

Alternate fumigants currently on the market have drawbacks that do not make them a safe alternative both to personnel and equipment. Further, the process for the introduction of new chemicals is a costly undertaking usually only within the capability of the major chemical companies.

One such chemical alternative is called $ECO_2FUME$, which is a fumigant gas containing phosphine (2.6%) in carbon dioxide, provided by BOC Gases, a division of The BOC Group, Inc. Murray Hill, N.J. In Applicant's experience, this fumigant is most effective when coupled with a heating process and is associated with corrosion of most yellow metals, electrical components and machinery; and further can be explosive in certain atmospheric conditions and humidity levels. Accordingly, the use of $ECO_2$-Fume must be monitored and carefully controlled.

In large facilities or plants where fumigation can be applied, there is a requirement that the entire plant cease production and be closed for about 3–4 days. Such closures are associated with lost production and lost opportunity totaling approximately $10,000 per hour and often over $700,000 per day in larger plants.

Heat Treatment

A known alternative to the expense and increasing restrictions for the use of methyl bromide, is the use of high heating loads. It has been scientifically established that heat will eradicate all forms of pests, rodents and molds. The level of heat that is required in eradicating insects, beetles and molds is well above the ambient temperatures and a safe and abundant supply source of produced heat and temperatures is required.

There is a significant cost advantage to the implementation of heat treatment methods. When heat is used, problem areas of the plant can be dealt with on a localized and individual basis, production can be carried out as normal, and therefore the cost savings to the organization are extremely attractive. If the problem area involves active equipment, the area in question can be scheduled for a shutdown with minimal disruption to the overall operation of the plant. Therefore, heat treatment provides additional savings over and above that saved by avoiding the costs of fumigation chemicals.

Complications to heat extermination processes arise in that typical environments found in the food and grain storage industry are classified as explosive hazards due to dusts and particulates which are substantially always present. Therefore, such areas are classified by the US National Electrical Code (NEC) as Class I (atmospheres having flammable gases and vapors) or Class II (dusts), Division 1 (normally hazardous) and 2 (not normally hazardous). In Class II, the various atmospheres are divided into Group E (containing combustible metal dusts), Group F (containing combustible carbonaceous dusts) and Group G (containing combustible dust not included in Group E or F, including flour, grain, wood, plastic and chemicals).

One specific example relating to the aforementioned explosive complications was observed by Applicant at an actual mill undergoing heat treatment using conventional heat-producing equipment. The mill was classified as Class II, both Division 1 and 2, Groups E, F & G. The heating process used was very dangerous and typical of many current applications of such treatments in that the heating equipment used was not appropriately rated or classified for the hazardous operation. In this particular example, a naked propane flame was used. Further, there have been accidental fires caused by the use of open flamed apparatus in heat treatment applications for the extermination of termites. For this reason, the insurance industry is particularly interested in safer extermination methodologies.

Standards governing areas classed as being an explosion hazard do not permit ignition sources to be placed within the envelope and further, connections to ignition sources, gas or electrical, are not permitted to penetrate the envelope; blow back immediately following shutdown of flame or electrical heaters can involve residual ignition sources, such as high temperature surfaces, and present a hazard. Further, direct application of steam or products of combustion, results in excess moisture which is often detrimental to the treated area and its contents.

Applicant is not aware of any heaters which are available to this industry that have the capability of supplying the high output temperature parameters required and which are portable, nor are there heaters available for use in areas which present combustion or explosion hazards.

SUMMARY OF THE INVENTION

Applicant provides a heat exchanger which produces a surprisingly high efficiency and which, in its preferred embodiment, is part of a system which is highly adaptable for application in heat treatment processes for pest and mold extermination. Advantages of the present invention include: use of heat not chemicals and flameless heating with application of hot fluids such as steam, the invention can be classified for use in explosion-proof environments (Class II, Div 1 and 2, Groups E, F and G). The efficient heat transfer arrangement enables efficient heating or cooling of process fluid flows. Facilities that benefit from heat treatment with explosion proof equipment include: grain mills (flour, oats, bran, corn, rice etc.), grain storage depots; warehousing depots; rail cars; ship holds; food preparation facilities and wood shipping pallets or other such dunnage. Further, molds are also a major source of concern in the stored grain industry and as a possible cause of sick building syndrome. The present invention can also be effective against mold. Safe, portable steam heaters that can deliver high heating output can play a major role in the control of molds. Heat has been identified as an alternative to chemicals in the process of eliminating molds.

Accordingly, in a broad aspect of the invention, an improved heat exchange apparatus is provided adapted for insertion into an air plenum or housing with a bore through which a first fluid flows from an inlet to an outlet and having an array of two or more heat exchange tubes located in the bore through which a second fluid flows, the improvement comprising:

one or more linearly extending sections of the heat exchange tubes extending substantially parallel to a direction of air flow through the bore of the housing, the bore of the housing being substantially unimpeded so that the first fluid passes along a length of the tubes; and a plurality of spaced and circumferential fins formed along the two or more heat exchange tubes and extending substantially perpendicular to the direction of air flow through the bore of the housing, the first fluid flowing through the bore of the housing and transverse to the fins for discharge from the outlet of the housing.

In another aspect, the invention is a system for the exchange of heat between first and second fluids comprising a tubular housing having an axis and a bore, the bore having an inlet for the admission of the first fluid and an outlet for the discharge of the first fluid; a fluid mover in the inlet for moving the first fluid from the inlet to the outlet of the bore; the improved heat exchange apparatus of parallel tubes and perpendicular fins; and means for moving the second fluid through the tubes so that heat is transferred through the tubes and fins between the first and second fluids.

Orientation of the fins substantially perpendicular to the flow of air through the heat exchanger permits a greater residence time of the transferring fluid (usually hot) within the heater and thus a more effective transfer of heat between the transferring fluid flowing in the tubes and the fluid (usually cooler air) flowing between the tubes and fins.

In yet another aspect, the invention comprises a method for the extermination of pests within an envelope of air comprising the steps of minimizing openings in the envelope; heating ambient air within the envelope using a heat exchanger; discharging the heated air into the envelope; and sustaining the flow of heated air into the envelope so that the temperature of air in the envelope is sufficiently high to kill pests.

BRIEF DESCRIPTION OF THE DRAWINGS

FIG. 1a is a schematic view of one embodiment of the invention having at least one heat exchanger of the present invention wholly within an envelope for applying heat to a structure in the envelope for the heat extermination of pests therein;

DESCRIPTION OF THE PREFERRED EMBODIMENT

Figure 1B:
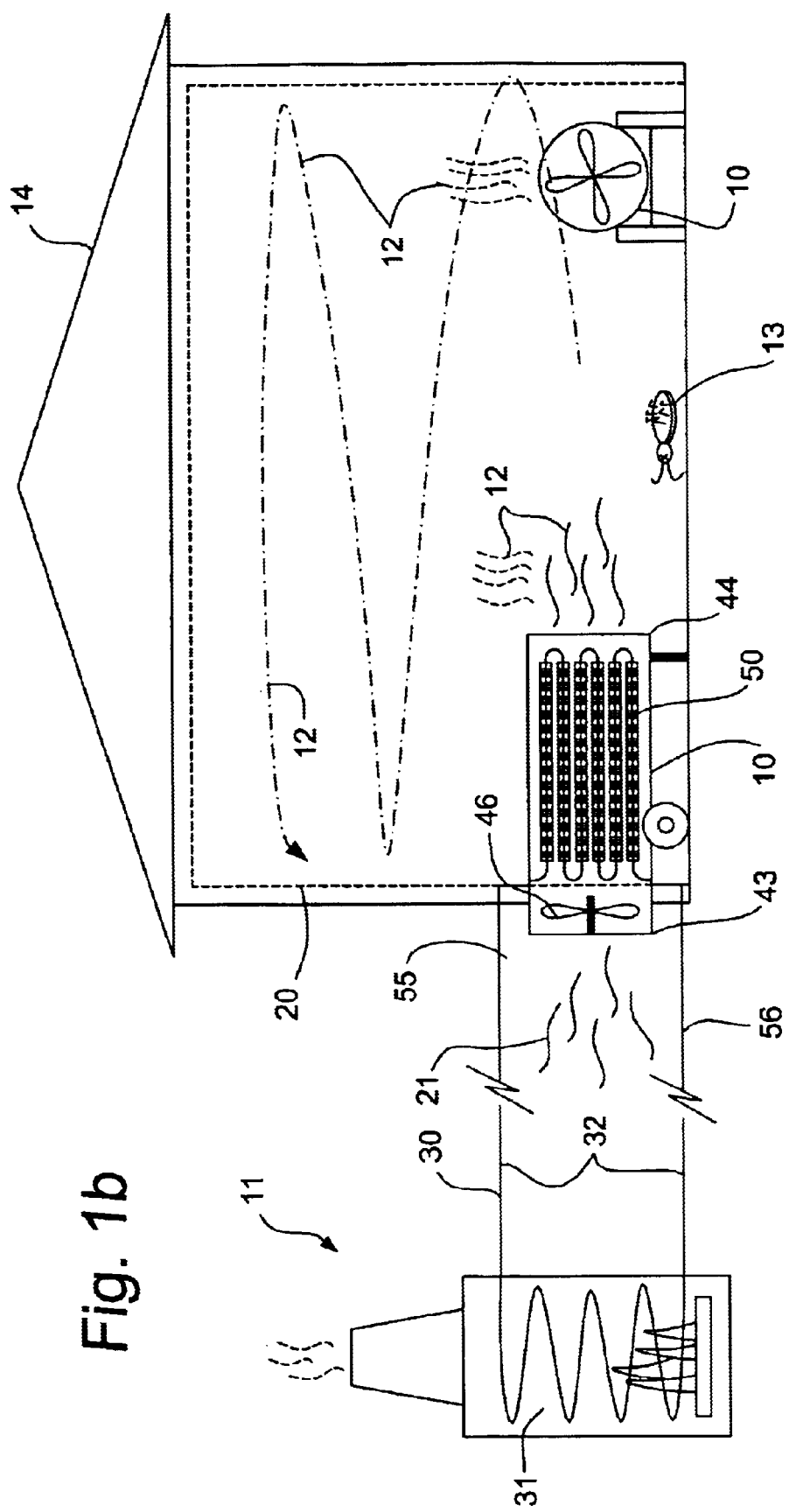
FIG. 1b is a schematic view of an alternate embodiment of the invention having at least one heat exchanger of the present invention having an inlet outside the envelope and an outlet within the envelope for applying heat to a structure in the envelope for the heat extermination of pests therein.
Figure 2:
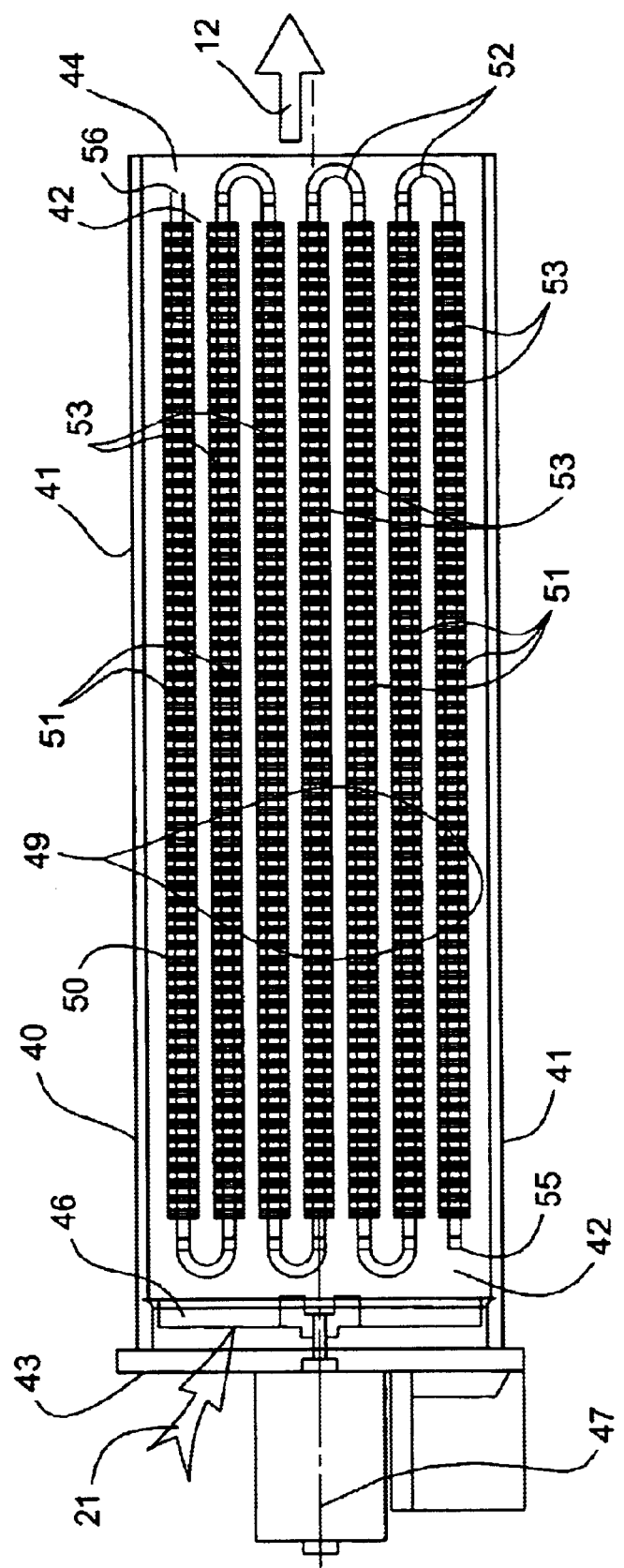
FIG. 2 is a side cross-sectional view through the housing and which illustrates a plurality of linearly extending sections and U-sections of the finned heat exchange tubing.

The present invention is described in terms of its preferred embodiment, as illustrated in FIG. 1a, which is novel apparatus applied to advantage as a heater 10 which uses hot fluid from a heat source 11 for producing heated air 12 suitable for the extermination of pests 13 in sensitive environments such as a building or structure 14. Other embodiments include cooling applications and substitutions of the heating and heated fluids. The apparatus provided is adapted for insertion into an air plenum or housing, for example, a heating or cooling duct, a furnace or air-conditioner or a heater.

Heat treatment is a safe alternative to chemicals because the heat treatment can be readily calculated for supplying a pre-determined amount of heat and air movement over a quantified amount of time. If the treatment is interrupted or the heat output drops significantly, the process can be started again without significant disadvantage or economic loss. Indirect heat transfer producing heated ambient air has a further advantage in that the acceptable and present environment is merely heated without introduction of noxious or moisture laden byproducts.

In order to safely treat classified areas, an objective is to produce a heater which is portable for enabling quick turnaround, that is lightweight so that it can be placed in strategic areas and positions for best results, and which is efficient, explosion-proof and further, is cost effective. As stated above, classified and certified heating is required because of the hazardous potentials that are inherent with food processing, i.e. dusts and particulates (Class II) as well as on-site storage of industrial chemicals (Class I). Accordingly, the apparatus or the products of the apparatus providing the heat treatment is ideally explosion proof; e.g. indirect heating using steam or other hot liquids being typical explosion proof heat sources. The source of heat 11 can be itself explosion proof or be located remote from the hazardous area and be subsequently conducted to the treatment area. If used in hazardous areas, any penetration of the treatment area must be with an acceptable heating or energy stream; unclassified electrical or combustion flue being unacceptable and indirectly heated air, steam or hot fluids being generally acceptable. Accordingly, for classified areas, the temperature of the steam or other second fluid would be provided at a temperature above that necessary to exterminate pests yet be below that which would constitute an ignition source in case of blow back or other contact between the hazardous atmosphere and the heat exchanger.

Steam generation offers a very attractive alternative to using propane alone because steam generators are about 50% more efficient than standard propane construction heaters. Steam generators can be used in conjunction with existing plant steam sources to supply the heating medium for treatment. If plant generated steam is unavailable, a trailer with a steam generator and fuel and water supply would be a very simple exercise to put together for temporary heat treatment solutions. Further, penetration of a hazardous area by steam lines does not violate standards as it does not provide an ignition source, even if back flow occurs.

Thus, in more detail and with reference to FIG. 1a, in a first embodiment, an envelope 20, such as within the structure 14 itself, is heat-treated for the extermination of pests 13. At least one heater 10 circulates a first fluid, such as cool ambient air 21, through the heater 10. The heater 10 receives a second fluid, such as steam 30, as a source of heat from a steam generator 31. The steam 30 is supplied to the heater 10 through circulation lines 32. The cool air 21 picks up heat from the heater 10 and hot air 12 is discharged into the envelope 20. The envelope 20 typically comprises an environment which is at risk of combustion or of an explosion, such as grain storage structure 14. Such structures 14 are subject to restrictions which require the use of explosion proof devices.

A suitable steam generator 31 uses CSA or UL certified components including motors, junction box enclosures and materials. Depending on what pressures and materials used, burst pressure testing may be performed. For example, if a copper core is used then that material is burst tested at a 4 to 1 ratio to the listed data plate pressure.

For maximal heat penetration and thermal efficiency of the extermination of pests, a first approach is to minimize the volume of the envelope 20. In some cases the envelope 20 is used to define or separate areas for treatment and thus avoid interfering with normal operations elsewhere. Further, minimizing the envelope 20 also minimizes the heat requirement resulting in a cost saving benefit. In the case where an entire room or floor is to be isolated, the envelope 20 is normally sealed including usual openings and points of egress such as doors and windows (not shown).

Turning to the apparatus as shown in FIGS. 2–5, the heater 10 comprises a tubular housing 40 having a cylindrical wall 41 enclosing a bore 42. The bore has an inlet 43 at one end and an outlet 44 at another end. For lightweight construction, the cylindrical wall 41 is a two part hollow shell. The inlet 43 is fitted with a mover or fan 46 for moving the first fluid, such as air 21, through the bore 42 and along an axis 47 of the housing 40 between the inlet 43 and the outlet 44.

Figure 3:
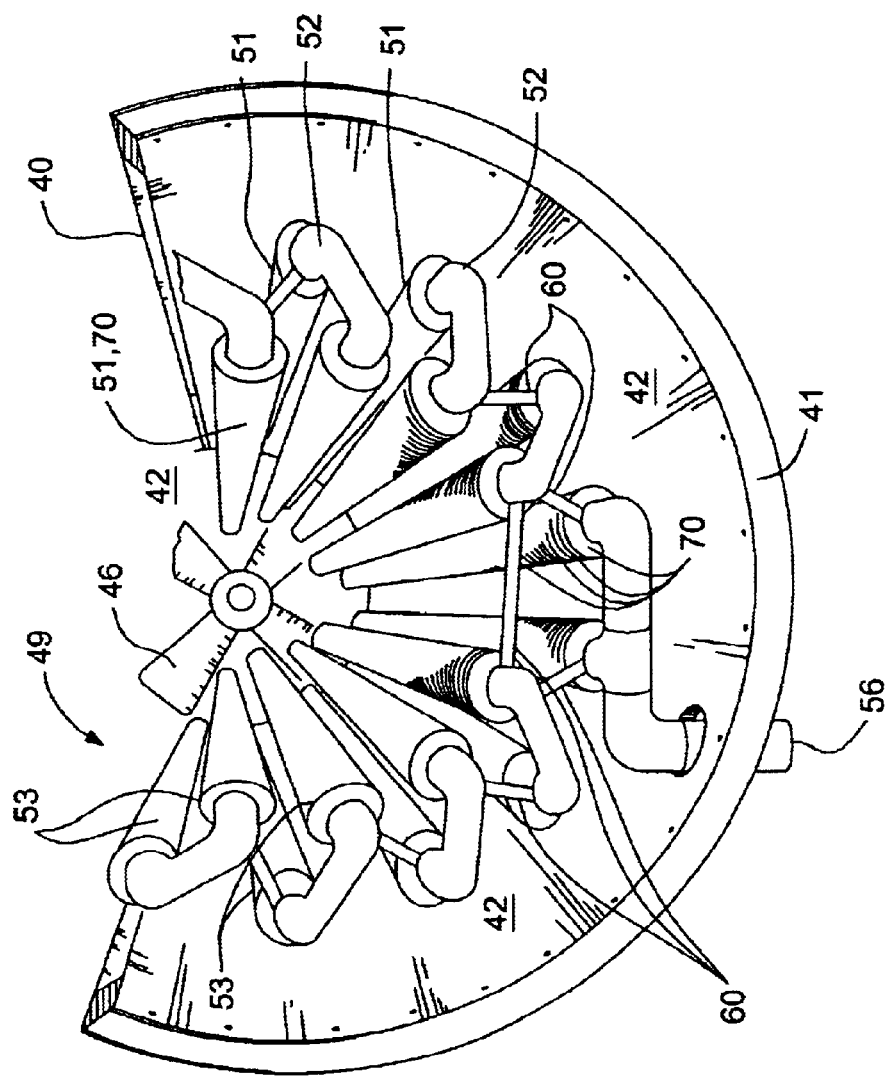
FIG. 3 is a partial perspective view of the heat exchange tubing situate in the bore of the housing, viewed from the outlet towards the inlet.

With reference also to FIG. 3, an array 49 of heat exchange tubes 50 is located in the bore 42 within the housing 40. At least one continuous length of tubing 50 is formed as the tubing winds back and forth axially between the inlet 43 and outlet 44 to form a plurality of continuous and linearly extending sections 51. The sections 51 extend along the bore 42, each being substantially parallel to the axis 47 of the housing 40. Each successive and linearly extending section of tubing 51 is connected together alternately at the inlet and at the outlet ends using U-shaped connectors 52 to form pairs of U-shaped sections 53 of heat exchange tubing. Thus, each U-shaped section comprises a linearly extending section 51 extending from a location adjacent the inlet 42, along the housing 40 and parallel to the housings' axis 47 to a location adjacent the outlet 44, through a U-shaped connector 52 and to another a linearly extending section 51 of the tubing 50 which returns to a location adjacent the housing's inlet 43.

Figure 4:
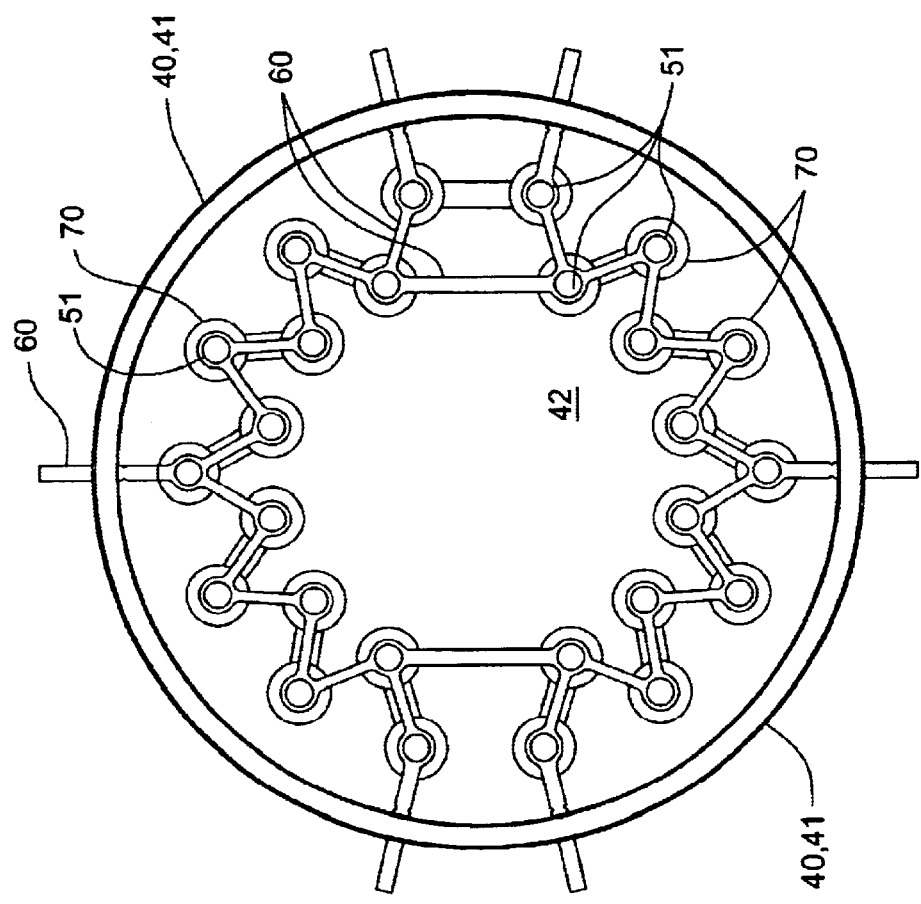
FIG. 4 is a transverse cross-section through the housing and tubing according to line 1B—1B of FIG. 2, and which illustrates the indexed circumferential array of finned heat exchange tubing and one form of internal structure spider or cartridge for supporting the tubing.

Further, and having reference to FIGS. 3 and 4, for maximizing the length and surface area of the tubing 50 that fits within the circular cross-section of the bore 42, each successive linearly extending section 51 is parallel to one another and are Indexed circumferentially within the bore 42. A spider structure 60 supports the sections 51 within the housing 40. To maximize the cross sectional area of the bore 42, each section zig-zags slightly between radially outward positions adjacent the housing wall 41 and a radially inward position while incrementally indexing angularly about the circumference of the housing 40. The structure 60 is arranged to extend alternately between adjacent U-shaped sections and axially inline with adjacent U-shaped sections. As a result of the orientation of the linearly extending sections 51 extending parallel to the axis 47 and spacing therebetween, the bore 42 is substantially unimpeded for enabling air 21 to flow therethough.

Each continuous tubing 50 has a fluid inlet 55 and a fluid outlet 56 for circulating a flow of second fluid or steam 30. While one continuous tubing 50 can wind through the entire housing 40, alternate arrangements include two or more lengths of continuous tubing 50, each having a fluid inlet 55 and fluid outlet 56. The inlet and outlet 55, 56 may include headers for multiple tubing starts. In the case of the steam generator or boiler 31, the fluid inlet 55 supplies hot steam 30 to the tubing 50 and the fluid outlet 56 conducts cooler steam or condensate out of the tubing 50.

The linearly extending sections 51 extend co-axially with the flow of air 21 through the bore 42 for maximal contact and maximal thermal transfer between the tubing 50 and the air 21. Accordingly, each successive linearly extending section 51 forms alternating co-current and countercurrent heat exchangers in the flow of air.

Figure 5:
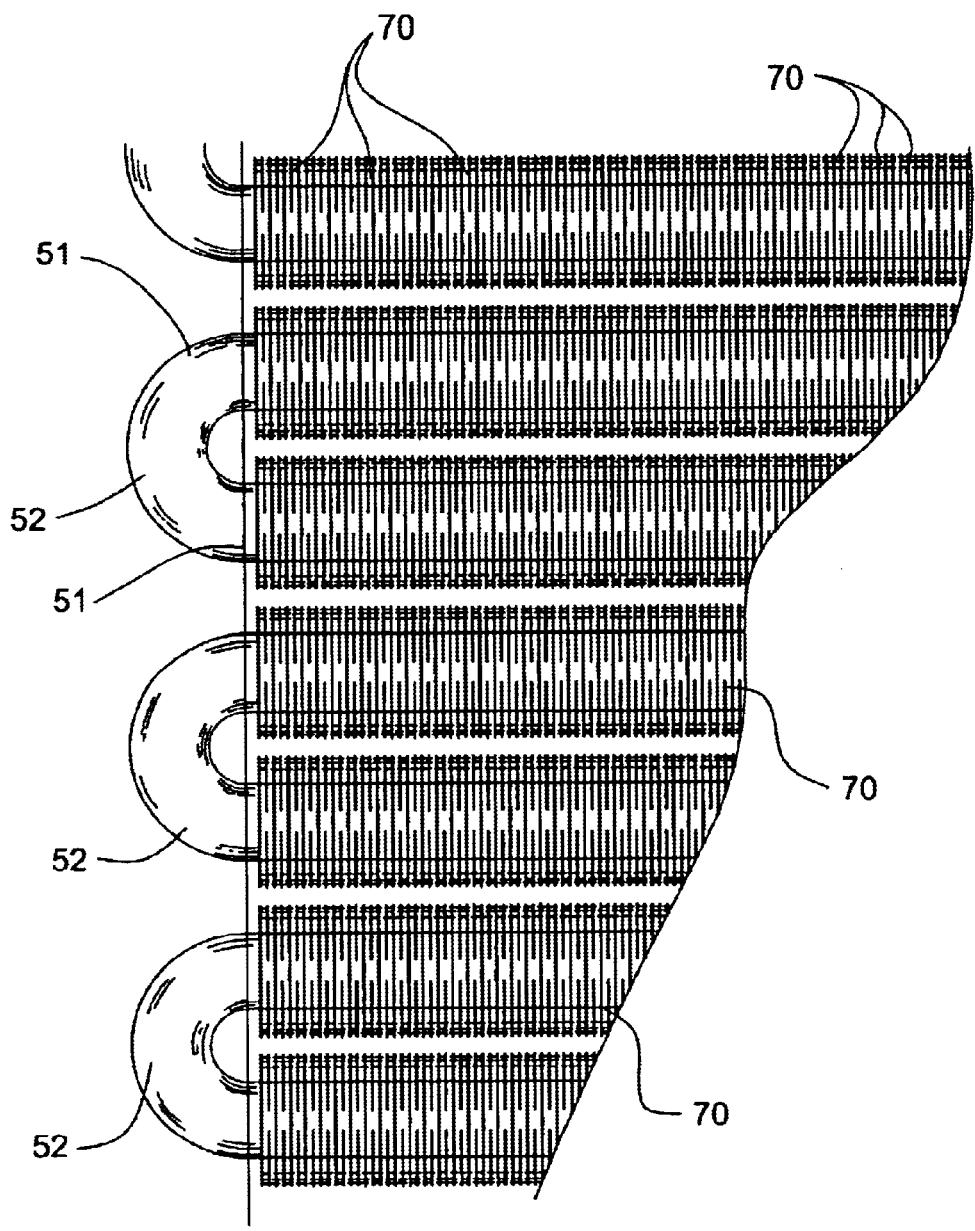
FIG. 5 is a more detailed illustration of a rolled out view of the serpentine arrangement of finned tubes.

With reference to FIG. 5, to further increase the surface area of the tubing 50 and to increase the effectiveness of heat transfer, the linearly extending sections 51 of tubing are fitted with a multiplicity of circumferential fins 70. Contrary to conventional finned tube heat exchangers, the present invention orients the fins 70 transverse to the flow of air 21. Rather than orienting the fins conventionally so that the air passes parallel and between fins, the transverse fins 70 cause the air to swirl in eddies around each fin. It is believed that a bluff-body effect is achieved in which the air meets a perpendicular surface (the fin) and is forced to change its direction of flow, forming an eddy current. The eddy current of air is carried by natural convection into the forced air stream flow and to the next fin in turn. This effect continues in parallel for each fin in sequence to the end of each of the parallel linearly extending sections of tubing. Optionally, as circular fans, typically used to move air over the tubes, impart a rotation to the flow of air being discharged therethrough, the tubes 50 may be angled slightly with respect to the housing 40 to ensure that the fins 70 are positioned transverse to the flow of air 21.

With reference to FIG. 4, the array of linearly extending tubing is supporting in the housing using an internal structure such as a spider or cartridge.

The heat exchange system of the present invention is particularly applicable for the heat treatment of areas affected by pests or molds. As stated it is further recognized that such areas often have hazardous materials and hazardous location classifications located therein.

A suitable heat treatment is where a certain amount of heat is applied so as to bring an envelope 20 or an area and everything therein up to a certain temperature and maintain that temperature for a predetermined amount of time. The amount of heat required to result in particular treatment temperatures is calculated using heat balance calculations for the envelope 20 including heat loss and heat sink calculations. Government and other scientific sources have determined the time and temperature required to eradicate pests such as stored grain pests. For example, for a stored grain product pest, a temperature of 122° F. is lethal after 2–3 hours. Time and temperature vary depending upon the application. For instance, extermination of fruit flies in fruit stores is accomplished with about 120° F. for 2 to 7 hours.

A system, as shown in FIGS. 1a 1b, using one or more heaters as described above is provided. A first fluid such as air 12 is directed over the tubes 50 while a second source of fluid such as steam 30 is circulated through the tubes 50 resulting in discharge of a heated first fluid 12. In the prior art, it is known that in many circumstances, free discharge of products of combustion, hot steam or hot water vapor as the heat source is damaging to equipment and to food stuffs. Accordingly in the present invention, steam 30 expended in the tubes 50 is returned to the boiler 31 or to a holding tank. Typically, the first fluid 12 is substantially dry ambient air which is forced over the tubes for producing a hot air which is discharged into the envelope 20.

Having reference again to FIG. 1a, an envelope 20 is formed about an area containing pests 13 and openings are minimized. One or more additional heaters 10 can be located wholly within the envelope 20. A thermal gradient is produced between the inside and the outside of the envelope 20. Accordingly, the heated air 12 is discharged and directed into the envelope 20 so that the temperature of air 12 in the envelope 20 and any air 12 exiting the envelope 20 is sufficiently high to kill pests 13. As the usual openings are blocked, heated air 12 in the envelope 20 can flow through points of leakage such as cracks and gaps in the structure which are often a refuge for pests 13.

Optionally, as shown in FIG. 1b, at least one heater 10 can be positioned with the inlet 43 outside the envelope 20 and its outlet 44 communicating with the inside of the envelope 20 to assist in creating a positive air pressure within the envelope 20. The use of a mover 46 such as a fan to flow air through the heater 10 and into the envelope 20 raises the pressure within the envelope 20 to pressures greater than outside the envelope 20 (typically ambient atmospheric pressure) so that heated air 12 is caused to exit the envelope 20 through these one or more points of leakage. Alternatively, existing area ventilation or exhaust fans can be directed inwardly and used to assist in creating the desired positive pressure environment.

Heaters 10 are placed at strategic intervals within the envelope 20 to insure that the heat is displaced evenly to insure proportional heat up schedules. Optimally, thermal monitoring equipment (not shown) is used to study the air movement and temperatures to ensure that an even and adequate temperature is present. Hard wire sensors can be permanently placed through-out the building and temperature reading stations are located outside of the envelope for the safety of employees. The heaters can be supplemented with circulation fans placed within the heat treatment envelope 20. The circulation fans may be those provided with the heaters 10 or separate equipment, which is preferably explosion-proof.

Where the envelope 20 encloses a classified or explosion hazard, a steam generator 31 which cannot be conventionally rated as explosion-proof, is located outside and remote from the envelope 20. Steam conduit supplies steam to the heater's heat exchange tubes 50 and an explosion proof blower 46 or other such mover directs the heated air 12 into the envelope 20. Any circulation fans used are also explosion proof.

Sufficient differential temperature is applied so that the temperature of air discharged into the envelope 20 and any air 12 exiting the envelope is sufficiently high to kill pests. Temperatures of 122° F. for a period of 1–2 hours have been scientifically proven to be lethal to all forms of stored grain pests. This 122° F. temperature destroys adults, larvae, pupae and eggs of the grain storage pests, however temperature in excess of 160–180° F. are needed to insure that a thermal gradient of 122° F. has been reached within certain cavities and cracks. After the 122° F. temperatures have been attained, such temperatures are maintained for a period of about 2–6 hours to insure that a heat soaking has taken place. Heat sinks and certain types of building materials may require longer periods to reach the prescribed temperatures. Bioassays and samples may be placed in hard to reach areas to insure that a lethal dosage of heat has indeed taken place.

Heat sensors (not shown) can be place strategically within the envelope 20 for the transmission and monitoring of the sensors from a station outside of the envelope 20. Transmission can be through hard-wired or wireless means. Sensors are a factor in ensuring safe operation including limiting personnel exposure to high temperatures in the envelope 20. Temperatures as high as 160–180° F. can cause heat exhaustion or even heat stroke.

A cooling off time is prescribed for the heat treatment area. After the supply of heated fluid is discontinued, the exhaust fans are left running for as long as practical which allows for a slow and even cooling period across the entire heat treatment area. During cooldown, openings in the envelope 20 such as windows and doors remain closed to insure that cooler outside air is not reintroduced into the area too rapidly so as to avoid inflicting thermal damage to the structure 14 or machinery within the envelope 20.

EXAMPLES

Example 1 (Hot Water)

A heater was provided which implemented a 1,000,000 Btu Hotsy pressure washing machine using a kerosene-burning heat source. The heat source was rated at delivering 215° F. super heated hot water @ 8.75 USGPM. The unit was fitted with a ¼ hp explosion proof Doer motor and fan, the diameter of which was turned down to 15⅝" to fit a nominal 16" pipe used as a housing for the heater. A solid cast aluminum fan with a specification of about 2350 cfm for @ 1725 rpm was used.

The unit was fitted with a finned, copper tubing heat exchange core and inlet and return valves for flow control. The water inlet and returns lines were connected through quick connect hose coupler fittings for ease of hooking up the heater in a portable situation.

The core itself was 1.5" diameter annealed copper tubing. Twenty-four (24), 54" long linearly extending sections of copper tubing were fit in the bore of the housing. The sections were arranged parallel to each other and alternately indexed radially inwards and outwards in a circumferential pattern as shown in FIG. 4. Each 54" long linearly extending section was fitted with aluminum fins to the copper tubing to enhance the heat-transfer surface area. Successive sections of tubing were connected with copper U-connectors silver soldered together into a contiguous heat exchanger.

The hot water heat source hose was connected to the heat exchange core using ½", 300° F. steam hose with a 5/16" diameter.

| Outside Air Temperature (To) | 20° F. |
| Entering Air Temperature (Ti) | 20° F. |
| Final Air Temperature (Tf) | 130° F. |
| Entering Water Temperature (Twi) | 190° F. (approximate) |
| Leaving Water Temperature (Two) | 122° F. |
| Flow Rate | 8.75 US GPM |
| Air flow cfm | 2350 |

The Tf was measured at a distance of 3 ft from the outlet from the heater using a hand held thermometer. Ti was also measured with a hand held thermometer about 0.5 ft from the inlet. The Twi at the start of the test indicated that the unit was slugging the Hotsy boiler and therefore an average Ti of about 190° F. was used. The measurement was actually a measurement in the heat exchanger itself.

On the first fluid or air side of the heat exchanger, the heat capacity was about $Q=K_{air}$ (CFM) $\Delta T$; $Q=1.1$ ambient air (2350) (130–20); Q=284,350 BTU/hr. At the second fluid or liquid side, the heat flow was about $Q=K_{water}$ (US GPM)$\Delta T$; Q=490 (8.75) (190–122); Q=291,550 BTU/hr. Accordingly, an efficiency could be calculated at about 284350/291550= 0.975 or about 97.5%. This value could be slightly overstated due to fluctuations of the water and airside temperatures. The unit performed very well using hot water as the hot second fluid. Note that the airside and the liquid side tests were within 2% of each other.

Example 2 (Steam)

A 2.1 million BTU/hr steam generator such as a Cleaver Brooks, CB Packaged Boiler, Model PS 50–150 acted as the heat source for the same heat exchange core as was used in Example 1, containing 24 parallel and 54" long finned 1.5" diameter tubes. Thermo-couples were positioned on the heater. Steam supply hoses were 300 psi having a nominal ½" outside diameter and an approximate ¼" internal diameter. As before, the heat source was coupled to the heater using quick connect couplers.

Thermocouples were positioned to measure inlet and outlet air temperatures and to the core's aluminum fins and the copper portion of the core's inlet and outlet tubes to track the temperature drop from inlet to outlet.

The heat-exchanger tubing was provided with 15–25 psi steam at temperatures of between 223–241 F. About 1000 fpm of ambient air (about 76 F.) was moved through the bore of the housing and passed over the tubing with resulting output air temperatures being up to about 199 F.

| Inlet Air in F | Outlet Air out F | Steam out F | Steam in F | Inlet tube copper F | Outlet tube copper F | Steam press. (psi) |
|---|---|---|---|---|---|---|
| 76.4 | 173.4 | 82.5 | 223 | 211 | 139.3 | 15 |
| 79.3 | 180 | 75.5 | 216.6 | 215.4 | 144.3 | 15 |
| 79.9 | 180 | 70.3 | 213.9 | 215 | 147.3 | 15 |
| 82 | 184.4 | 78 | 225 | 223.3 | 166.5 | 15 |
| 76.7 | 191.2 | 99.4 | 229 | 226.7 | 178.1 | 20 |
| 80 | 192.5 | 91 | 234.3 | 232.5 | 192.7 | 20 |
| 74 | 197.3 | 116.6 | 237.9 | 236.5 | 194.6 | 25 |
| 77.4 | 199.2 | 108.1 | 240.9 | 236.9 | 198.2 | 25 |

Example 3 (Steam)

A test was performed in a 48,000 cu. ft. building using a boiler capable of producing a maximum of 500 psi of steam. The boiler was located outside the building on a trailer having fuel tanks containing diesel such as is typically used in the oil and gas industry as an onsite energy source. The test was carried out over a 2–3 hour time period with the doors of the building open. The heat exchanger tubing was provided with 15–50 psi of steam at temperatures between 202–255 F. About 1600 cfm of ambient air was moved through the bore of the housing and passed over the tubing with resulting output air temperatures being up to about 206° F. As with Example 2, thermocouples were positioned to measure inlet and outlet air as well as the drop in temperature from copper inlet to copper outlet.

| Inlet Air in F | Outlet Air out F | Steam out F | Steam in F | Inlet tube copper F | Outlet tube copper F | Steam press. (psi) |
|---|---|---|---|---|---|---|
| 70 | 164 | 197 | 202 | 180 | 140 | 15 |
| 71 | 165 | 190 | 205 | 183 | 145 | 15 |
| 71 | 165 | 204 | 204 | 183 | 142 | 15 |
| 62 | 170 | 203 | 211 | 185 | 144 | 20 |
| 65 | 166 | 204 | 207 | 185 | 145 | 20 |
| 65 | 164 | 204 | 206 | 184 | 142 | 20 |
| 65 | 177 | 204 | 213 | 205 | 152 | 20 |
| 62 | 177 | 204 | 215 | 206 | 151 | 25 |
| 70 | 206 | 255 | 255 | 177 | — | 50* |

\* Gauge was not calibrated therefore results may be falsely low.

Additionally, to illustrate the actual capacity to raise the temperature in a large area and at the end of the test, the building doors were closed except for a gap of approximately 1.5" to allow the steam lines to penetrate the envelope and remain in the building. The ambient temperature of the building at the time the doors were closed was 65 F. Approximately 23 minutes later, the ambient temperature in the 48,000 ft$^3$ building had risen to 89 F., with an estimation that the ceiling temperature may have been higher than 110° F.

While the above has concentrated on the applicability of the apparatus and methods to the heating of a fluid for the extermination of pests and molds, there are other embodiments which and capitalize on the efficient and safe heat exchange apparatus of the present invention.

In the construction industry, certain types of construction practices require dry heat for drying purposes or for worker comfort in inclement weather. Heaters burning propane also discharge unacceptable amounts of moisture, carbon monoxide and carbon dioxide into the air. Further, emissions of propane heaters have been proposed as being a health hazard for the construction worker. Coupled with a low pressure steam generator, use of the heater of the present invention would result in a 50% cost savings on propane costs alone and deliver equal or better heat output without the associated health risks.

As a heat exchange apparatus is merely a means for transfer of heat from one fluid to another, the heat exchange apparatus of the present invention can act as a process cooler.

The configuration of the heat-exchange apparatus enables placement in many different positions or environments. Within the linearly extending portions of the heat exchange tubes, the tubes can also be arranged in a twisting or helical configuration arranged substantially linearly or progressing slightly helically along the direction of the air flow so as provide a longer length of tubing and to allow the air to contact the heat exchanger longer, thereby resulting in more efficient heat transfer.

The unit can be fabricated out of a variety of materials of construction. While the cores are preferably formed of copper, other metals such has steel or stainless steel can be used depending on pressure, medium and heating or cooling requirements. The heater/cooler can be staged in a series or parallel configuration to insure that adequate heating or cooling can be achieved on larger projects.

The embodiments of the invention in which an exclusive property of privilege is claimed are defined as follows:

1. A system for the exchange of heat between first and second fluids comprising:
   a tubular housing having a substantially horizontal axis and a bore, the bore having an inlet for the admission of the first fluid and an outlet for the discharge of the first fluid;
   a fluid mover in the inlet for moving the first fluid from the inlet to the outlet of the bore;
   an array of heat exchange tubes located in the bore and having two or more substantially linearly extending sections extending substantially parallel to the axis of the housing, the tubes having a multiplicity of axially spaced and circumferential fins formed therealong which extend radially from the tubes, the bore of the housing remaining substantially unimpeded so that the first fluid moves through the bore along the length of the tubes and transverse to the fins for discharge from the outlet, the array further comprising one or more U-shaped sections each formed of one of the linearly extending section which extends along the housing substantially from the inlet to the outlet and connected to another of the linearly extending sections which extends along the housing substantially from outlet to the inlet for conducting a second fluid therethrough for alternating co-current and countercurrent flow with the first fluid; and
   means for moving the second fluid through the tubes so that heat is transferred between the first and second fluids,
   wherein two or more of the one or more U-shaped sections are indexed circumferentially and in parallel arrangement about the axis of the housing, the linearly extending sections and the U-shaped sections being sufficiently spaced to enable the first fluid to flow therebetween from the inlet to the outlet of the housing, the two or more U-shaped sections being connected together to form a contiguous and extended heat exchange surface.

2. The heat exchange system of claim 1 wherein the second fluid is a heated fluid for heating the heat transfer tubes so that as the first fluid is moved from the inlet to the outlet over the tubes, the temperature of the first fluid is elevated.

3. The heat exchange system of claim 2 further comprising a boiler for generating steam as the heated second fluid.

4. The heat exchange system of claim 1 wherein the second fluid is a cooled fluid for cooling the heat transfer tubes so that as the first fluid is moved from the inlet to the outlet over the tubes, the temperature of the first fluid is cooled.

5. The heat exchange system of claim 3 further comprising:
   a fluid inlet to the array of heat exchange tubes; and
   a fluid outlet from the away of heat exchange tubes, wherein the boiler can be connected between the fluid inlet and outlet.

6. The heat exchange system of claim 5 wherein the boiler is located remote from the housing.

7. The heat exchange system of claim 6 wherein the fluid mover for the first fluid is explosion proof whereby the heat exchange system is capable of being situated within an envelope and the boiler is located outside the envelope.

8. The heat exchange system of claim 7 wherein the envelope encloses an explosion hazard.

9. The heat exchange apparatus of claim 8 further comprises structure for supporting the linearly extending sections in alternating radially outward position adjacent the housing and a radially inward position while incrementally indexing angularly about the circumference of the housing.

10. The heat exchange apparatus of claim 1 further comprises structure for supporting the linearly extending sections in alternating radially outward position adjacent the housing and a radially inward position while incrementally indexing angularly about the circumference of the housing.

* * * * *